Figure 1:
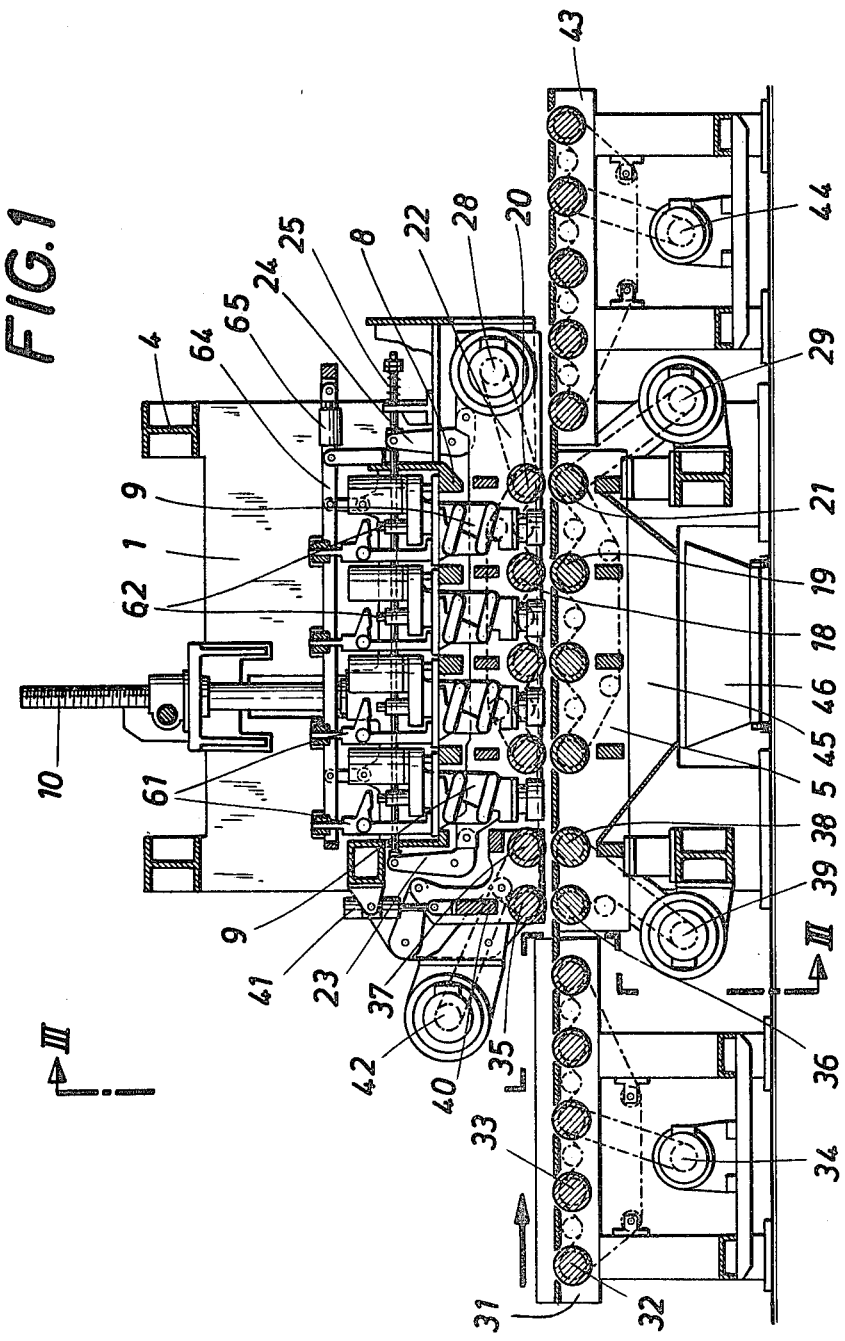

United States Patent [19]

Linsinger

[11] 4,357,817
[45] Nov. 9, 1982

[54] PROCESS AND TOOL FOR DEBURRING FLAME-CUT SHEET METAL ELEMENTS

[76] Inventor: Ernst Linsinger, A-4662 Steyrermühl, Austria

[21] Appl. No.: 157,319

[22] Filed: Jun. 9, 1980

[30] Foreign Application Priority Data

Jun. 26, 1979 [AT] Austria .................................. 4454/79

[51] Int. Cl.³ ............................................. B21D 31/06
[52] U.S. Cl. ............................................ 72/71; 72/76; 409/301
[58] Field of Search ....................... 72/71, 76; 29/33A; 409/297, 298, 401

[56] References Cited

U.S. PATENT DOCUMENTS

| 864,370 | 8/1907 | Grill ...................................... 72/76 |
| 1,958,103 | 5/1934 | Kelly .................................... 409/301 |
| 3,307,254 | 3/1967 | Williams ............................... 29/90 R |
| 3,487,669 | 1/1970 | Kemp .................................... 72/76 |

FOREIGN PATENT DOCUMENTS 64414 10/1968 German Democratic Rep. .

Primary Examiner—Lowell A. Larson
Attorney, Agent, or Firm—Kurt Kelman

[57] ABSTRACT

The flame-cut sheet metal elements to be deburred have a surface which lies substantially in a plane and have edge portions which are formed with sharp-edged metallic burrs extending generally in said plane and carry slag beads which protrude from said surface. Tool means are caused to perform a gyratory motion parallel to said plane and while performing said motion are engaged with said slag beads to break them off. Said tool means are caused to engage also said metallic burrs while performing a gyratory motion parallel to said plane, whereby said burrs are impact-deformed.

13 Claims, 7 Drawing Figures

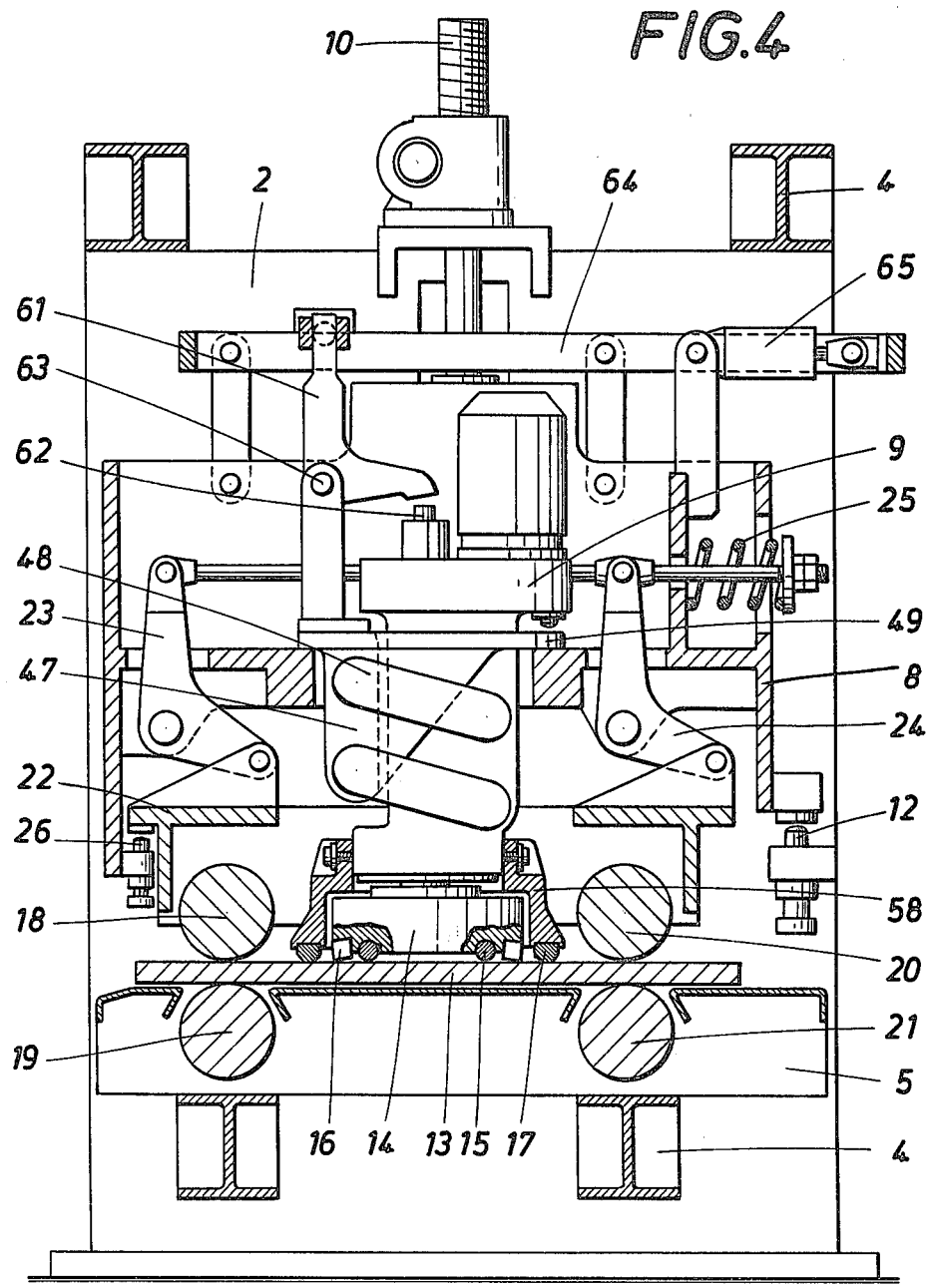

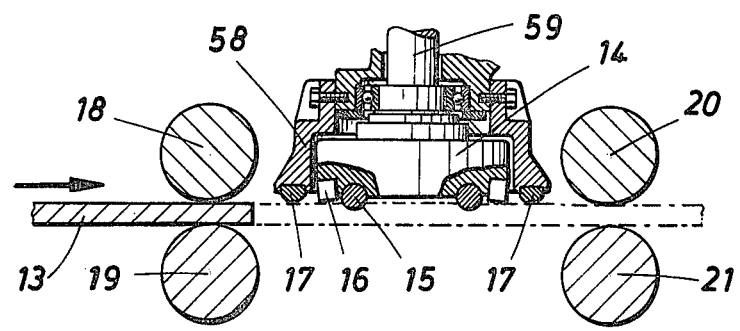
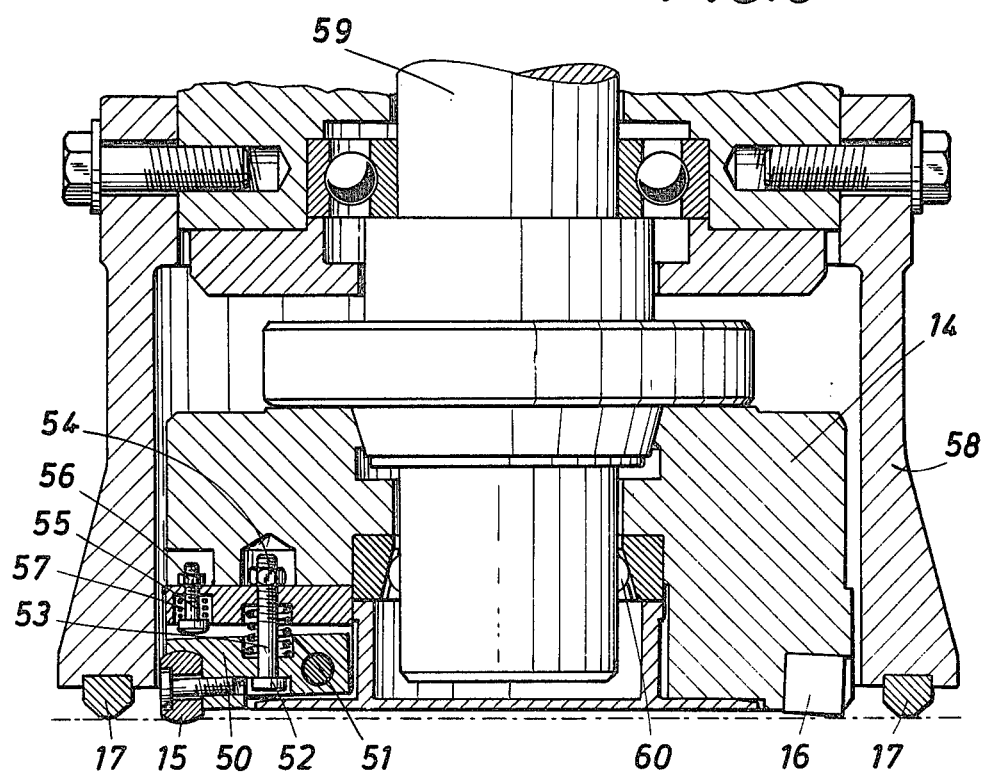

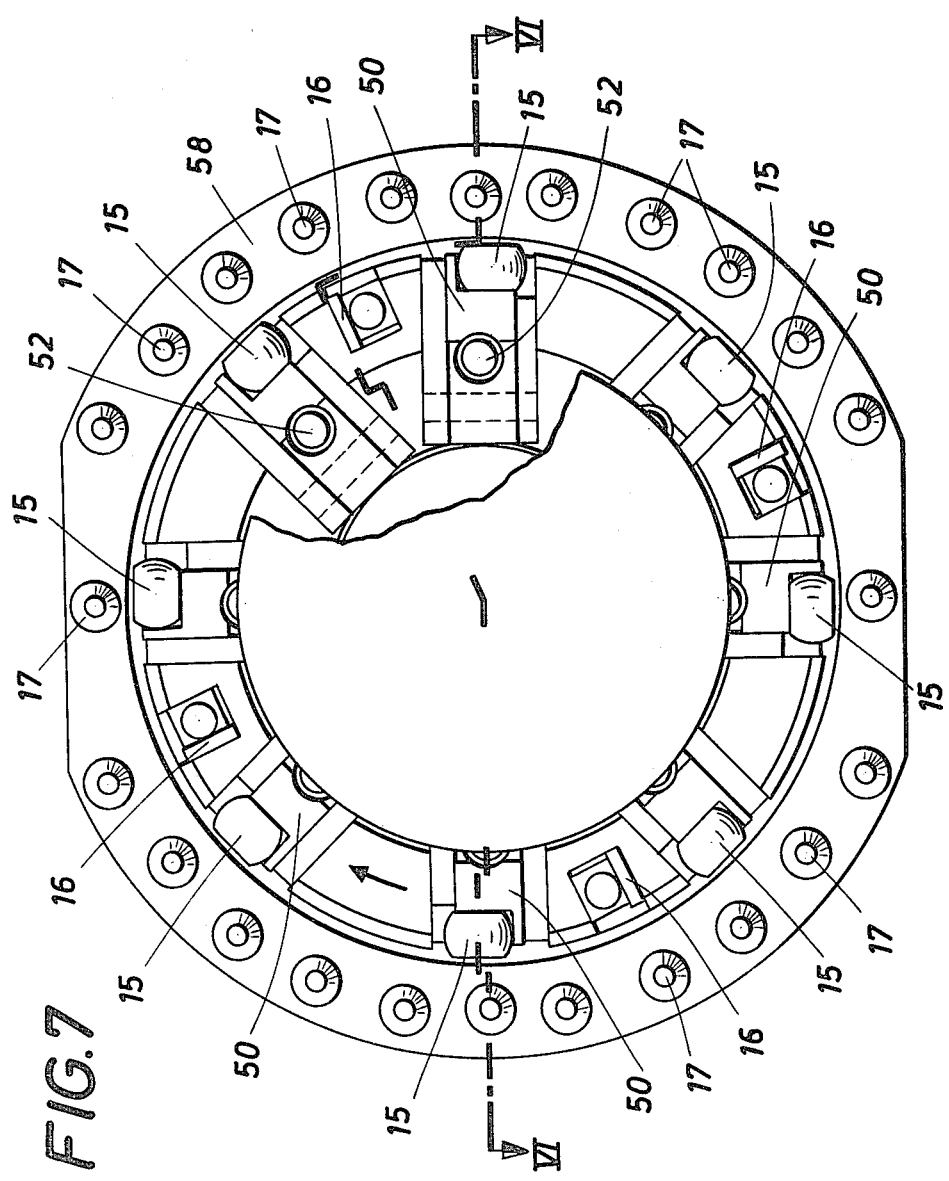

PROCESS AND TOOL FOR DEBURRING FLAME-CUT SHEET METAL ELEMENTS

This invention relates to a process of deburring the edge portions of flame-cut sheet metal elements, in which the slag beads protruding from the plane of the sheet metal are broken off by a gyrating motion parallel to the plane of the sheet metal element, and to a tool for carrying out that process.

Cold-worked sheet metal parts of various shapes are increasingly required in the mass production of machines, equipment and vehicles. Most of these cold-worked sheet metal elements are cut out from planar plates and are then press-formed. Smaller parts are usually stamped; larger parts are flame-cut with the aid of templates. Whereas flame-cutting is highly economical, it has the disadvantage that the cut surfaces produced thereby are not neat and that a burr is formed at the lower edges of the edge faces of the sheet metal elements lying on the burning-out grate. That burr inhibits the further processing by which the elements may be cold-worked or may be welded to other parts. For this reason such burrs must be removed. Deburring involves two different problems because thorough investigations have revealed that the term burr is used to describe two formations which are similar but not identical. In a narrow sense, the term burr describes an undesired outgrowth, which protrudes from the desired shape of the sheet metal element, i.e., from its plane and from its edge face. Such burr may be formed, e.g., when the sheet metal is squeezed as it is cut with shears or a fly cutter. In addition, there may be a deposition of beads of cooled slag (spongy iron oxide). For this reason, deburring requires a removal of the slag beads and of the actual metallic burr. This has not been accomplished before in a single operation and it was previously necessary at least in most cases to deburr the sheet metal elements manually, e.g., by grinding. A use of machines has been possible before only for breaking off slightly adherent slag beads; this has been accomplished by a tool having a cup-shaped striking head and breaking plates disposed near the periphery of said head. The burr cannot be removed with these known tools nor with known smoothing tools, which comprise rolls for smoothing the surface of a sheet metal element. Whereas it might seem obvious to mill off the metallic burr, this concept has failed in practice because the flame-cut sheet metal elements have irregular edges, which extend along straight lines at different angles to an imaginary principal axis, or may be curved or may define apertures of numerous kinds. A milling tool fed in the usual manner cannot possibly machine a workpiece along such edges.

It is an object of the invention to provide complete slag-removal and deburring at the edge portions of flame-cut sheet metal elements can be effected in a single operation entirely by a machine without need for any manual work on the workpiece.

This object is accomplished according to the invention in that the slag beads are broken off and the sharp edges of the remaining metallic burr are broken by being simultaneously impact-deformed by a gyratory motion. Experiments have shown that a desired slag removal can be effected by breaking off the slag beads by a relatively slow motion but more effectively at a higher relative velocity. Very thorough additional investigations have led to the basic recognition that it will be entirely sufficient for practical requirements to impact-deform the metallic burrs. This opens the way for an economical slag removal and deburring by machine in such a manner that all edge portions can be treated by the gyratory breaking-off and impact-deforming motions even in conjunction with a feed along a straight line and regardless of the orientation of these edge portions in the plane of the sheet metal element.

The invention provides also a tool for carrying out that process. The tool comprises a cup-shaped rotary striking head which is provided near its periphery with breaking plates, and also comprises a bearing member for engaging the surface of the workpiece and is characterized in that the striking head is equipped with preferably spherical striking elements which are axially movable against a restoring force beyond the plane that is defined by the cutting edges of the breaking plates, and that the bearing member consists of an axially adjustable copying member, such as a copying head that surrounds the striking head and is provided with copying elements which may have for instance, the shape of mushrooms or runners. When the tool has been applied to the workpiece, the striking head is moved over the plane of the sheet metal element by the feed movement. In that operation, the slag beads are broken off first by the breaking plates disposed near the periphery of the striking head so that only the metallic burr at the edges remains. These edges are now impact-deformed by the striking elements of the striking head. These striking elements may consist, e.g., of hardened balls. The impact deformation is due to the relative movement of the striking elements, which rotate at a high speed with the striking head, and the workpiece, which is slowly advanced in the feeding direction. When the tool is applied to the workpiece, the striking elements protrude downwardly beyond the breaking plates below the upper boundary surface of the workpiece. When a striking element impinges on a sharp edge, the kinetic energy of the striking element is transformed into work of deformation so that the metallic burr is squeezed. Whenever the striking head moving relative to the workpiece engages the latter, the slag beads in the area engaged by the tool will be broken off by the breaking plates and the metallic burr will be squeezed by the striking elements. The tool is suitably applied against the workpiece under its own action of the weight or by a double-acting hydraulic cylinder. The copying member used as a bearing member ensures that the striking head will exactly follow the surface of the workpiece and will always be maintained relative to the workpiece in the position required for a proper deslagging and deburring. It will be understood that the force under which the tool is applied to the workpiece must exceed the sum of the restoring forces exerted on all striking elements that are mounted in the striking head. The peripheral velocity of the striking head is greatly in excess of the velocity at which the workpiece is fed relative to the tool. When these velocities are properly selected, all edge portions will be effectively acted upon regardless of the angles and orientation of these edge portions relative to the feeding direction. This is due to the fact that the gyrating striking elements will act on any edge portion and can act on the side faces of apertures just as on external edge faces. It will be understood that each tool can act on the workpiece only in a strip-shaped path having a width which is determined by the diameters of the flight circles of the breaking plates and of the striking elements. If a single tool is to be used to work on a wider area of the workpiece, the tool will have to be moved over the surface of the workpiece several times. It will be preferable to provide a plurality of tools, which are distributed across the workpiece and are suitably staggered from each other. In such an arrangement, the width of the path in which a striking head can produce an optimum striking effect will determine the number of tools or the pitch of the paths along which a single tool is repeatedly moved over the surface of the sheet metal element.

Within the scope of the invention, the extent to which the striking elements protrude is preferably selectable or adjustable because that extent with which an optimum impact deformation will be effected will depend on the striking speed, on the strength of the workpiece material and on the mass of the striking elements.

To prevent an unacceptable indentation of the surface of the workpiece and to provide for an absorption of shocks as the striking elements are axially depressed, the movement of the striking elements into the striking head is limited within the scope of the invention by a stop which is adjustable and/or resilient.

A desirable design of the means for holding and adjusting the striking elements will be obtained in accordance with the invention if each striking element is mounted at the outer end of an oscillating lever, which preferably extends radially with respect to the axis of the striking head and which is urged by a prestressed spring toward the workpiece against an axially adjustable stop collar whereas the movement of said lever away from the workpiece is limited by an adjustable and shock-absorbing stop pin.

Figure 2:
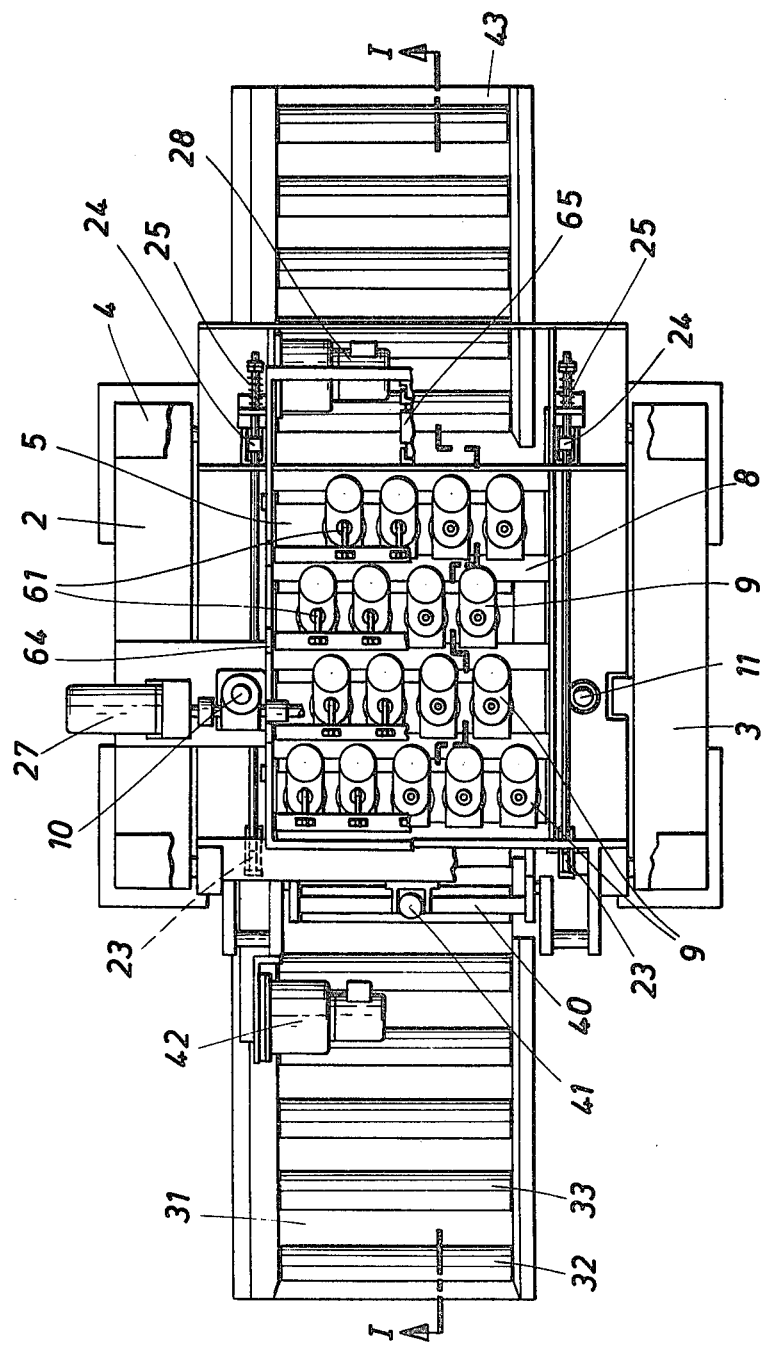
Figure 3:
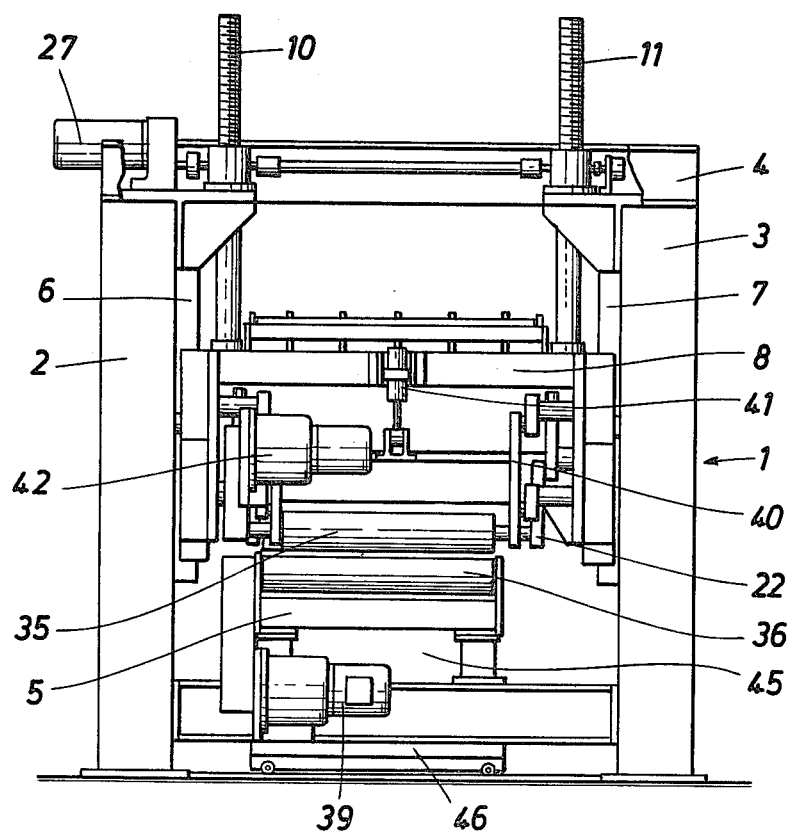

An embodiment of the invention is shown by way of example on the accompanying drawings, in which FIG. 1 is a longitudinal sectional view taken on line I—I of FIG. 2 and showing a machine for deburring flame-cut sheet metal elements with tools embodying the invention, FIG. 2 is a top plan view showing that machine, FIG. 3 is a transverse sectional view taken on line III—III in FIG. 1, FIG. 4 is an enlarged diagrammatic view showing a tool of that machine, FIG. 5 shows the position of the striking head of a tool before the workpiece arrives, FIG. 6 is an enlarged sectional view taken on line VI—VI of FIG. 7 and showing the striking head of a tool and FIG. 7 is an end view showing that tool.

A portal 1 consisting of two columns 2, 3 and a crosshead 4 is installed in fixed relation to a roller table 5. Four groups of tools 9 are mounted on a carrier 8, which is adjustable in height along guides 6, 7 of the portal 1. The carrier 8 and the tools 9 are initially in a raised position so that the path through the machine is free. As the operation is started, the carrier 8 with all tools 9 is lowered by means of screws 10, 11 against a stop 12. The latter has been adjusted to a position which depends on the thickness of the sheet metal element 13 that is to be treated (FIG. 4). Each tool 9 comprises a striking head 14, equipped with striking elements 15 and peripherally arranged with breaking plates 16. The striking elements 15 protrude below the end face of the striking head and are axially movable against a restoring force. The flight circle defined by the cutting edges of the breaking plates 16 is concentric to and larger in diameter than the flight circle defined by the lower apices of the striking elements 15. The stop 12 is so adjusted that the breaking plates 16 just contact the sheet metal element 13 when the carrier 8 engages the stop 12. Each tool 9 bears on the surface of the sheet metal element with adjustable copying elements 17, which may be mushroom-shaped and which are aligned with the breaking plates 16. This will ensure that the striking head will be maintained in the same position relative to the sheet metal element even when the latter has a wavy surface. The lower apices of the striking elements 15, which are subjected to a resilient bias, protrude to a selected extent below the plane defined by the cutting edges of breaking plates 16. That extent will be preselected in dependence on the speed of the striking head, the feeding velocity, the strength of the material of the workpiece and the mass of the striking elements.

When a sheet metal element 13 is advanced under the striking heads 14 which have thus been adjusted to their operating position, the breaking plates 16 will first strike the edge portions of the workpiece at high speed to break off the slag beads. Thereafter, the striking elements 15 will strike the edges of the sheet metal element and will climb on and slide over its surface and will finally disengage the same at the end of the advancing sheet metal element or at different edge portions, for instance, at apertures. As a result, all edge portions will be struck by the breaking plates and by the striking elements regardless of the direction of travel of the workpiece and of the orientation of the edge portions. As a result of this operation, the slag beads will be broken off and the burrs at edge portions will be impact-deformed. The impact deformation can be controlled because the mushroom-shaped copying elements 17 are axially adjustable relative to the striking elements 15 and the stroke of the striking elements is adjustable too.

The workpiece 13 is advanced by driven pairs of rollers 18, 19, 20, 21. The lower rollers 19, 21 are embedded in the roller table 5. The upper rollers 18, 20 are mounted in a pinch roller frame 22, which is suspended from carrier 8 by pivoted levers 23, 24. In position of rest, the pinch roller frame 22 is urged by springs 25 against a stop 26. As the carrier 8 is lowered by means of the screws 10, 11, which are driven by a motor 27, the pinch roller frame 22 is lifted from the stop 26 and the biasing springs urge the upper pinch rollers 18, 20 onto the sheet metal element 13 so that the driven pairs of rollers cause the workpiece to advance. All upper rollers 18, 20 are synchronously driven by a motor 28, which is incorporated in the pinch roller frame 22. A motor 29 incorporated in the roller table 5 rotates the lower rollers 19, 21 in synchronism with the upper rollers 18, 20.

Whereas the pairs of rollers 18, 20, 19, 21 pull the workpiece 13 through the machine, they will not always be able to take hold of the sheet metal element, particularly of a relatively heavy-gauge sheet metal element, as it is fed by the feed roller table 31 comprising feed rollers 32, 33 that are driven by the motor 34. For this reason, the pairs of rollers 18, 20, 19, 21 are preceded by additional pairs of feed rollers 35, 36, 37, 38. The lower feed rollers 36, 38 are mounted in the roller table and driven by the motor 39. The upper feed rollers 35, 37 are mounted in an auxiliary frame and rotated by the motor 42. The auxiliary frame 40 is vertically guided in carrier 8 and can be reciprocated by a hydraulic cylinder 41. A workpiece that has been placed on the feed roller table 31 is advanced by the rollers 32, 33 until the workpiece is stopped by engaging a stop, not shown, which is provided near the feed rollers 35, 37, 36, 38. At this time, the pairs of feed rollers 35 to 38 are still open. In response to the workpiece striking the stop, the upper rollers 35, 37 are lowered and their rotation is started. As a result, the workpiece is gripped between the pairs of rollers 35, 37, 36, 38 and is advanced by them. The workpiece is subsequently engaged and advanced by the pairs of rollers 18, 20, 19, 21 and finally reaches a delivery roller table 43, which is driven by a motor 44. On the roller table 43, the workpiece is arrested by another stop, which is not shown, and can then be removed.

The slag particles and any chips which have been removed from the workpiece will fall through the gaps between the lower rollers of the roller table 5 into a chip hopper 45 and from the latter into a bin 46, which can be pulled out transversely.

Each tool 9 is mounted on the carrier 8 by means of bracket 47, from which the tool is suspended by parallel links 48. The stroke of the tool 9 is limited by stops 49. In operative position, the tool is forced against the workpiece 13 under the action of its own weight or by a double-acting cylinder. The elevation of the several tools is controlled by copying elements so that the breaking plates 16 and the striking elements 15 are maintained in a predetermined position relative to the surface of the workpiece even if that surface has undulations.

Each tool comprises a cup-shaped striking head 14, in which the fixed breaking plates 16 are circularly arranged. The striking elements 15 are mounted in the striking head 14 by oscillating levers 50, which are pivoted to the striking head and extend approximately radially to the axis of the striking head and at their outer ends carry the spherical striking elements 15. A pressure-applying spring 51 urges the oscillating lever 50 against a stop collar 52 of a stop pin 53. The latter is adjustable relative to the end face of the striking head by stroke-limiting nuts 54. The stroke of each oscillating lever 50 is limited by a shock-absorbing pin 55, the elevation of which can be adjusted by an adjusting nut 56. For shock absorption, the shock-absorbing pin 55 is biased by a prestressed spring 57. The copying member consists of a copying cup 58, which is secured to the housing of the tool 9 so as to be adjustable in height. The copying cup surrounds the striking head 14. Mushroom-shaped copying elements 17 are carried by the copying cup at its end face.

A quick-acting chuck 60 is provided to secure the striking head 14 to the driving spindle 59 of each tool 9 and is operable by a releasing rod 62, which extends through the driving spindle, and by a releasing lever 61, which cooperates with the releasing rod. To permit a joint, simultaneous actuation of the quick-action chucks 60 for all tools 9, the releasing levers 61 associated with all groups of tools are mounted in the carrier 8 on respective pins 63 and are interconnected by tie rods 64. The latter are displaceable by a hydraulic releasing cylinder 65. In response to the application of pressure to the releasing cylinder 65, the linkage is caused to impart a pivotal movement to all releasing levers 61 so that the releasing rods 62 for all tools 9 are actuated at the same time. When a replacement of tools is desired, all striking heads 14 can be removed from the driving spindles 59 at the same time and can be jointly placed on a suitable pallet. Similarly, new or repaired striking heads 14 can be chucked simultaneously if the above operations are performed in a reverse sequence.

What is claimed is:

1. In a process of deburring flame-cut sheet metal elements having a surface which lies substantially in a plane and having edge portions which are formed with sharp-edged metallic burrs extending generally in said plane and carry slag beads which protrude from said surface, wherein tool means are caused to perform a gyratory motion parallel to said plane and while performing said motion are engaged with said slag beads to break them off, the improvement residing in that said tool means are caused simultaneously to engage and impact-deform said metallic burrs while performing a gyratory motion parallel to said plane.

2. In a tool for deburring flame-cut sheet metal elements having a surface which lies substantially in a plane and having edge portions which are formed with sharp-edged metallic burrs extending generally in said plane and carry slag beads which protrude from said surface, in combination a plurality of first tool elements arranged in a first circle, a plurality of second tool elements arranged in a second circle which is concentric to and smaller in diameter than said first circle, drive means for imparting to said first and second tool elements a simultaneously gyratory motion about an axis on which said circles are centered, and bearing means engageable with said sheet metal element in a position in which said first and second tool elements are engageable with said slag beads and burrs, respectively, the tool elements being adapted to break off said slag beads and to impact-deform said burrs in the gyratory motion of said first and second tool elements about said axis.

3. A tool as set forth in claim 2, in which said drive means comprises a striking head which is centered on and rotatable about said axis and has a free end face, said first tool elements consist of breaking plates carried by said striking head and protruding axially from said free end face and having cutting edges which define a plane that is normal to said axis, said second tool elements consist of striking elements which are carried by said striking head and axially movable beyond said plane defined by said cutting edges, said striking head carries resilient means tending to project said striking elements from said free end face in the direction of said axis, and said bearing means comprises a copying member which is adjustable relative to said striking head in the direction of said axis.

4. A tool as set forth in claim 3, in which said free end face is annular and said breaking plates are arranged along the periphery of said free end face.

5. A tool as set forth in claim 3, in which said striking elements have spherical surfaces engageable with said burrs.

6. A tool as set forth in claim 3, in which said copying member consists of a cup-shaped member which surrounds said striking head and carries a series of copying elements which are arranged in a circle centered on said axis and engageable with said surface of said sheet metal element.

7. A tool as set forth in claim 6, in which said copying elements are mushroom-shaped.

8. A tool as set forth in claim 3, in which said striking head carries stop means adjustable in the direction of said axis and limiting the extent to which said striking elements protrude from said end face.

9. A tool as set forth in claim 3, in which said striking head carries back stop means for limiting the movement of said striking elements toward said end face.

10. A tool as set forth in claim 9, in which said back stop means is adjustable in the direction of said axis.

11. A tool as set forth in claim 9, in which said back stop means is resilient in the direction of said axis.

12. A tool as set forth in claim 3, further comprising a plurality of oscillating levers pivoted in said striking head and pivotally movable toward said free end face, each of said oscillating levers has an outer end and at said outer end carries one of said striking elements, said striking head carries a plurality of collars adjustable along said axis and limiting the movement of respective ones of said oscillating levers toward said free end face, spring means for urging said oscillating levers toward said collars, said striking head carries back stop means for limiting the movement of said oscillating levers away from said end face, and shock-absorbing means are associated with said back stop means.

13. A tool as set forth in claim 12, in which said oscillating levers extend radially with respect to said axis.

* * * * *